United States Patent
Becocci et al.

(10) Patent No.: US 7,249,661 B2
(45) Date of Patent: Jul. 31, 2007

(54) APPARATUS FOR THE CONTROL OF BRAKES IN BICYCLES AND THE LIKE

(75) Inventors: Andrea Fiorenzo Becocci, Prato (IT); Francesco Becocci, Prato (IT)

(73) Assignee: Formula S.R.L. (IT)

( * ) Notice: Subject to any disclaimer, the term of this patent is extended or adjusted under 35 U.S.C. 154(b) by 0 days.

(21) Appl. No.: 10/764,886

(22) Filed: Jan. 26, 2004

(65) Prior Publication Data

US 2004/0163897 A1 Aug. 26, 2004

(30) Foreign Application Priority Data

Feb. 20, 2003 (IT) ............................ FI2003A0044

(51) Int. Cl.
*B60T 11/00* (2006.01)
(52) U.S. Cl. .................................... 188/344; 188/24.16
(58) Field of Classification Search ................ 188/2 D, 188/151 R–344, 24.16; 60/547.1–589; 74/500.5–502
See application file for complete search history.

(56) References Cited

U.S. PATENT DOCUMENTS

| | | | | |
|---|---|---|---|---|
| 3,554,334 A | * | 1/1971 | Shimano et al. ............ | 188/344 |
| 3,729,070 A | * | 4/1973 | Le Marchand .............. | 188/170 |
| 4,032,200 A | * | 6/1977 | Farr ........................ | 303/116.4 |
| 4,391,353 A | * | 7/1983 | Mathauser ............... | 188/24.12 |
| 4,501,340 A | * | 2/1985 | Yoshida .................... | 180/219 |
| 4,771,649 A | * | 9/1988 | Modolo .................... | 74/489 |
| 4,896,753 A | * | 1/1990 | Sule ......................... | 188/344 |
| 5,099,958 A | * | 3/1992 | D'Aluisio ................ | 188/24.22 |
| 5,372,408 A | * | 12/1994 | Tsuchida et al. ........... | 303/9.64 |
| 5,632,362 A | * | 5/1997 | Leitner ..................... | 188/344 |
| 6,502,675 B1 | * | 1/2003 | Andrus ..................... | 188/344 |
| 6,805,372 B2 | * | 10/2004 | Gueugneaud ............. | 280/280 |

* cited by examiner

*Primary Examiner*—Christopher P. Schwartz
(74) *Attorney, Agent, or Firm*—McGlew and Tuttle P.C.

(57) ABSTRACT

The invention refers to an apparatus for the control of brakes in bicycles and the like, to be used, in particular, for disc brakes mounted on bicycles and comprising a pump able to push fluid into a hydraulic circuit connected to the brake, characterized in that the pump is held inside the handlebar or a part associated therewith.

13 Claims, 5 Drawing Sheets

APPARATUS FOR THE CONTROL OF BRAKES IN BICYCLES AND THE LIKE

The present invention refers to an apparatus for the control of brakes, in bicycles and the like, to be used, in particular, for disc brakes mounted on bicycles

BACKGROUND OF THE INVENTION

It is known that the action exerted upon the brake's lever is transmitted to a calliper acting on the disc through a hydraulic connection associated with a pump to urge the same calliper acting on the disc.

A drawback of the brake-controlling devices is due the fact that the brake pump, with relevant accessories, is applied to the handlebar, thereby constituting a separate element. This characteristic may result unsuitable owing to the fact that the handlebar has larger dimensions, the brake pump can be damaged by possible strokes, and may hurt the user in case of falls.

SUMMARY OF INVENTION

The object of the present invention is to overcome the above drawbacks.

This result has been achieved, according to the invention, by adopting the idea of making an apparatus having the characteristics disclosed in the claim 1. Further characteristics being set forth in the dependent claims.

The advantages of the present invention are that the apparatus has extremely limited overall dimensions and, therefore, gives the handlebar a greater compactness; that the presence of a hydraulic brake makes it possible to use the levers originally present on the bicycle, that is, those for brakes operated only by a cable; that there are no protruding parts likely to be damaged or providing a danger for the cyclist; that a more attractive appearance is conferred to the handlebar; that the braking maintains optimal performance; that the apparatus keeps its characteristics unchanged also after a prolonged use.

BRIEF DESCRIPTION OF THE DRAWINGS

These and other advantages and characteristics of the invention will be best understood by anyone skilled in the art from a reading of the following description in conjunction with the attached drawings given as a practical exemplification of the invention, but not to be considered in a limitative sense, wherein.

DETAILED DESCRIPTION OF THE INVENTION

In its general form, the basic characteristic of an apparatus for the control of brakes according to the invention, is that the said apparatus is held within a portion of the handlebar, or a part associated therewith such as, for example, a connecting lug or other similar elements.

Figure 1:
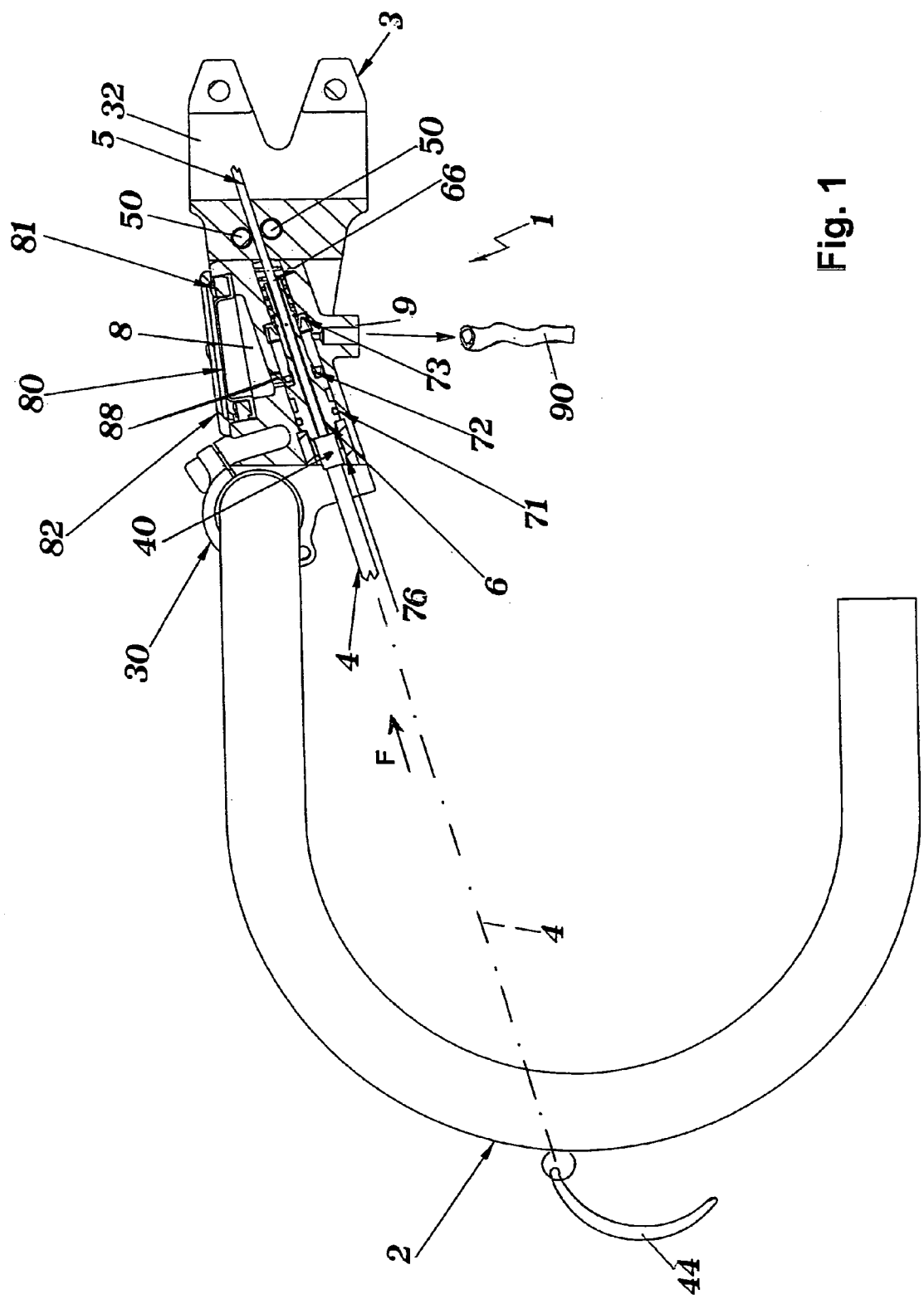
FIG. 1 shows a side view, with parts taken away, of a possible exemplary embodiment of an apparatus for braking control according to the present invention.

Referring in particular to FIG. 1, an apparatus 1 for the control of brakes according to the present invention, is fitted within the lug 3 which defines the connection between the handlebar 2 and the sleeve (not shown).

In particular, the lug 3 has first clamping means 30, 31 which allow fixing the apparatus 1 to the body of the handlebar 2, and second clamping means 32, 33 to be fixed to the steering stem 99 to be inserted into the sleeve. The clamping means consists of clamps 30 and 32 made up of two bodies joined by respective screws 31 and 33 in a manner known per se.

Provided inside the body of the lug 3 is a reservoir 8 for the oil of the hydraulic circuit operating the brake. In particular, the reservoir 8 is covered by a membrane 80 which is, in turn, covered by a lid 82 fixed by a relevant frame 81 to the body of the lug 3. The reservoir 8, via a conduit 88, is connected to the a chamber wherein there is a piston 6 for which a stop element 76 is provided. The sealing of the piston 6 is also ensured by O-ring gaskets having, respectively, oil-sealing 71, oil-stuffing 72, and counteracting 73 functions, the latter gasket being in contact with a spring 66.

The operation of the apparatus 1 is accomplished by actuating a lever 44 (shown schematically only) provided on the handlebar and connected to the apparatus by a sheath 4 which houses the relevant cable 5. One end of the cable 5 is attached to the lever 44, while the other end is fixed to the apparatus 1 in correspondence of two screw elements 50 being accessible via the passage 55, as more clearly shown in FIG. 1B.

As the cable is fixed in correspondence of the apparatus 1, the actuation of the lever 44 causes the displacement of the sheath 4 in the direction of arrow F; in this way, the bush 40, formed in the end of the sheath on the side of the apparatus 1, goes into abutment against the piston 6 causing the latter to be displaced in the same direction in order to push the oil through the outlet 9 connected to the hydraulic tube which leads to the brake's calliper. The presence of the spring 66, which is loaded by the action of the piston 6, allows the latter to return to the original position, that is, in the stand-by condition in which the brake's calliper is inoperative.

Figure 1A:
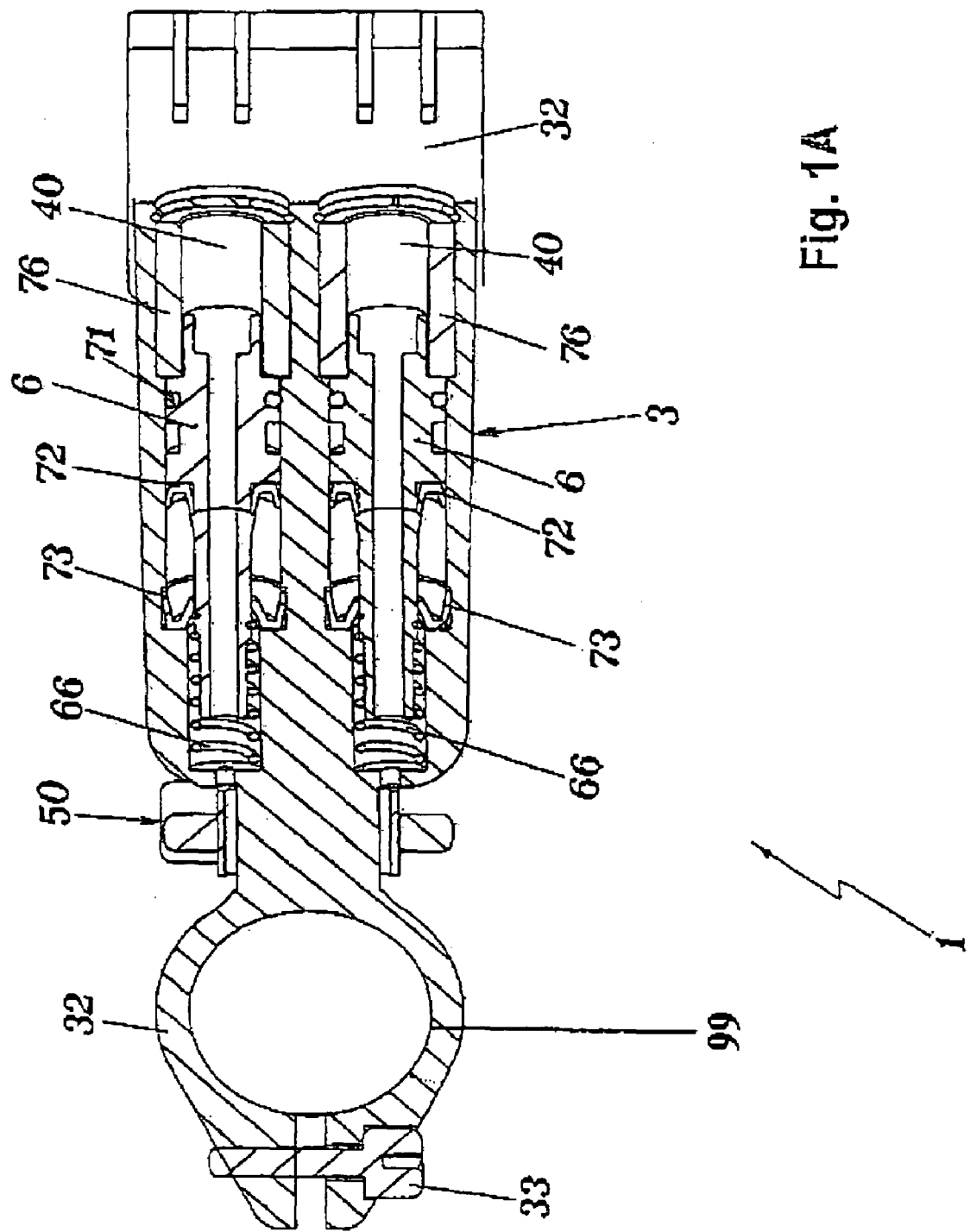
FIGS. 1A and 1B are respectively, a top view with parts in section (FIG. 1A) and a side view (FIG. 1B), with parts in section, of the exemplary embodiment shown in FIG. 1.
Figure 1B:
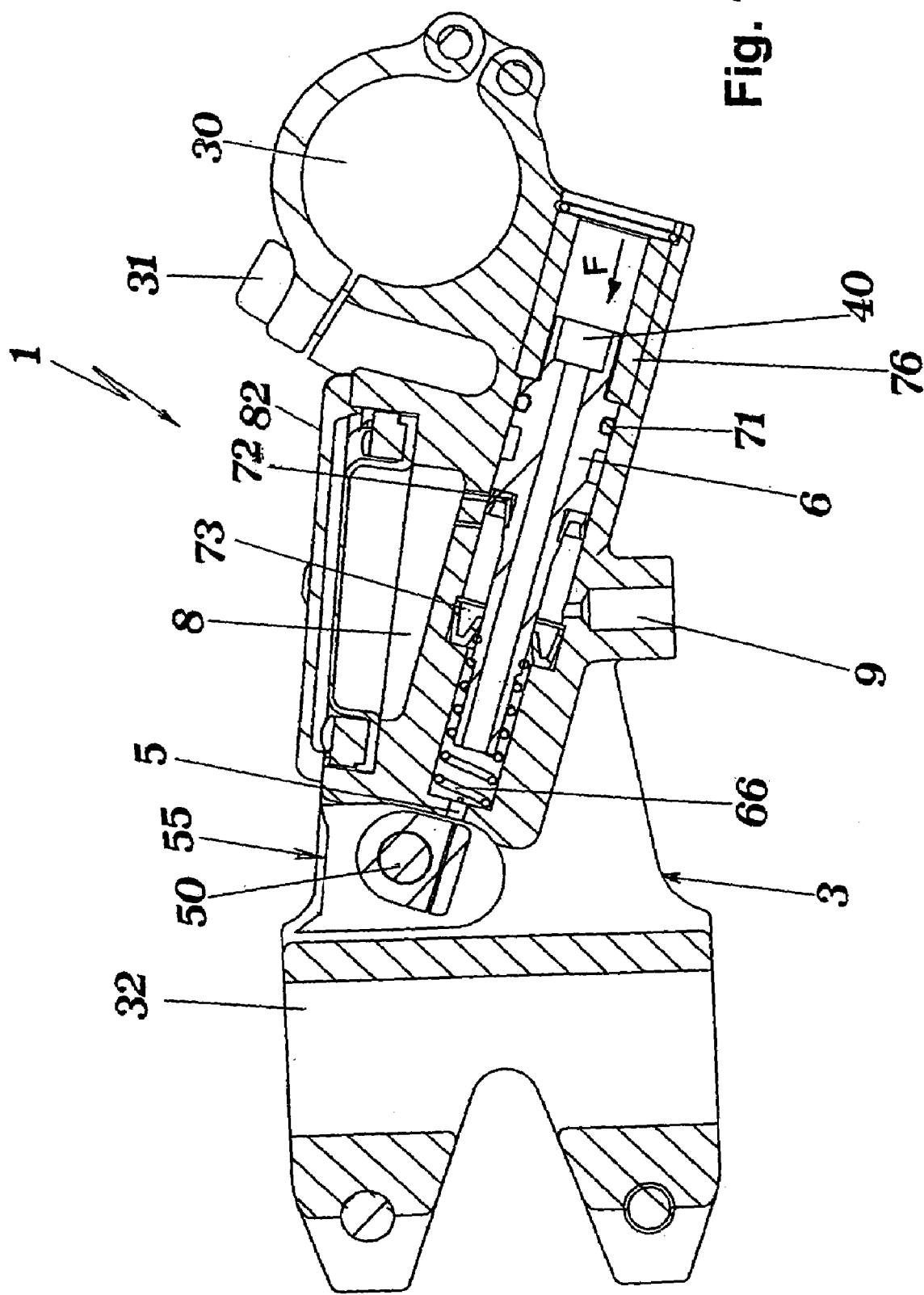

Shown more clearly in FIG. 1A are two piston pumps 6 disposed on the handlebar on the right and left side thereof, and actable by two levers in a traditional manner, for operating the two brakes, respectively.

Figure 2:
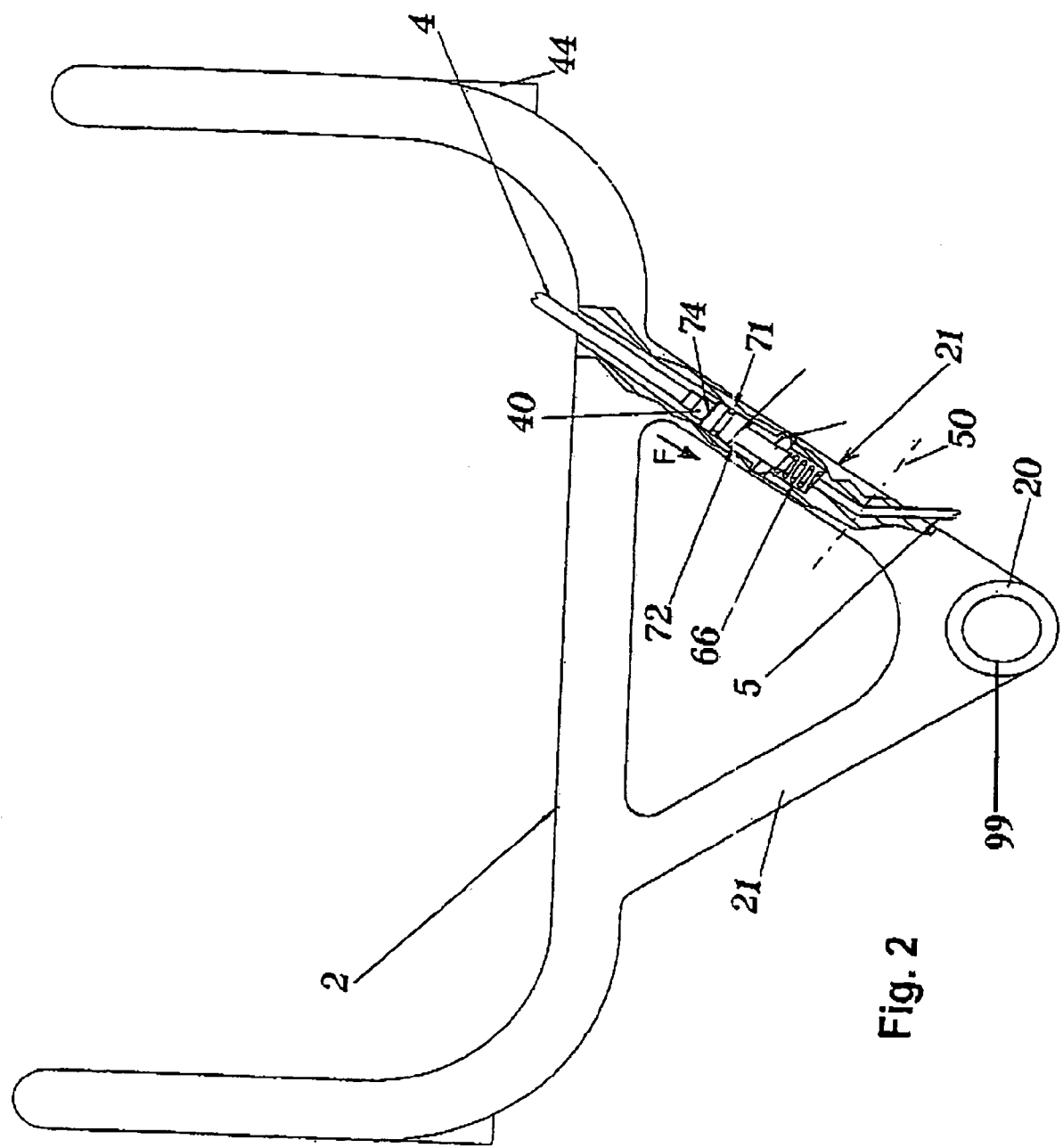
FIG. 2 is a top view, with parts taken away, of a further possible exemplary embodiment of an apparatus for braking control according to the present invention.

In the example illustrated in FIG. 2, the apparatus 1 is applied to a handlebar 2 of a type provided with a coupling 20 for the sleeve, and is inserted within the body of the handlebar 2, in particular within the portion 21 which connects the coupling for the sleeve 20. In this example, the apparatus 1 of the invention has been shown only for one of the two brakes, being understood that the invention is applicable, also in this case, to both the brakes. The parts have been indicated by reference numerals corresponding to those of similar parts in the preceding figures.

In FIG. 2, also the sheath 4 associated with the relevant lever 44 is shown only partially and it is not joined with the lever; besides, the cable 5 protrudes from the body of the handlebar to allow fixing the same cable more easily. Obviously, an open seat can be provided, that is, a seat accessible from the outside, in order to ensure the cable with screws, for example, so that the same cable will not project from the handlebar.

Again in this embodiment, the actuation of the lever 44 causes the displacement F of the sheath 4 and the consequent movement of the piston 6 connected with the bush 40 of the sheath 4, a snap ring 74 for the piston 6 being provided in correspondence of said bush. The piston 6, likewise in the previous example, pushes the oil of the braking circuit, via a conduit not shown, towards the brake's calliper. The spring 66 brings the apparatus back to the initial position when stopping the action exerted on the lever 44.

Figure 3:
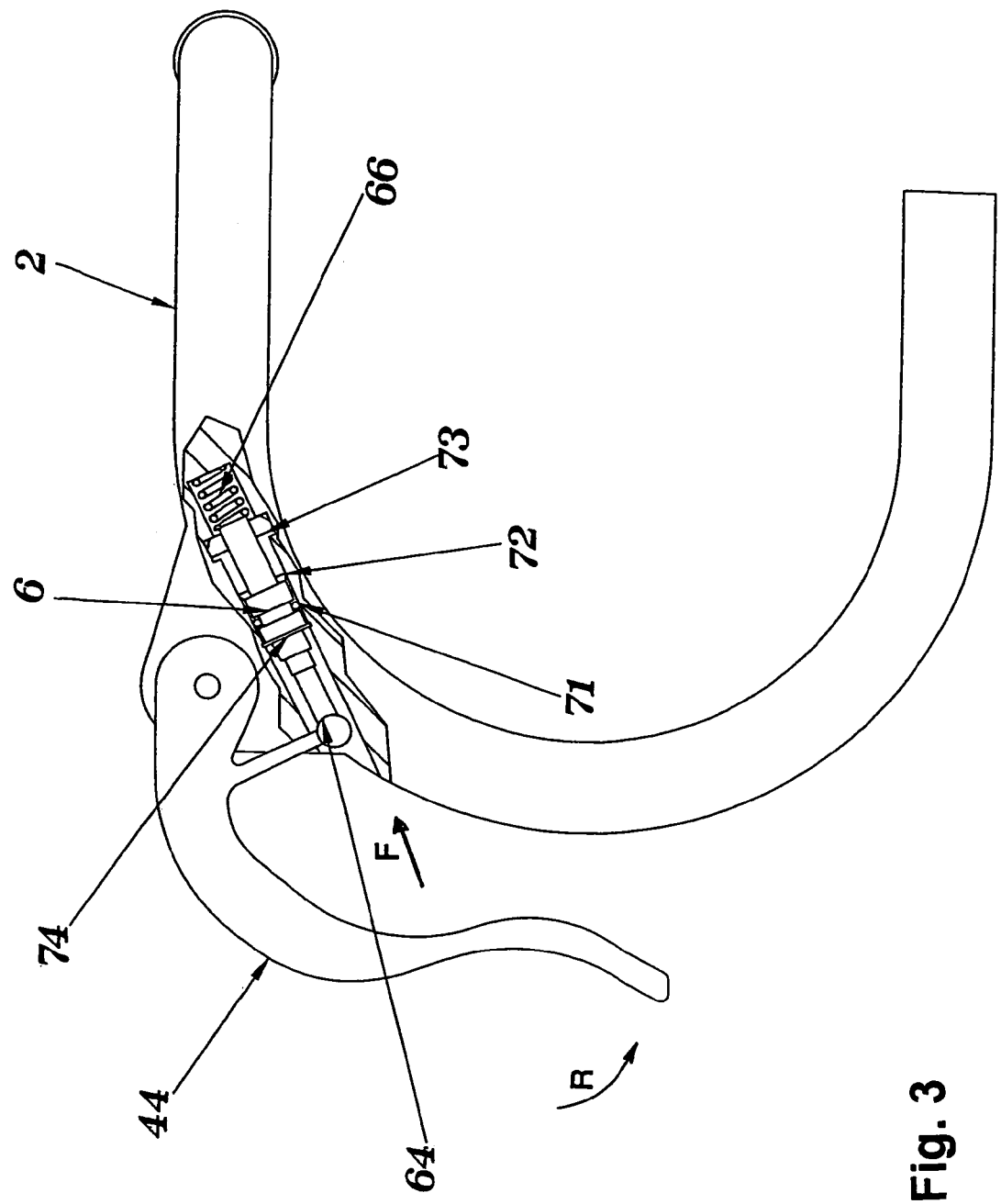
FIG. 3 is a side view, with parts taken away, of a further possible exemplary embodiment of an apparatus for braking control according to the present invention.

In the example of FIG. 3, the apparatus 1 is integral with a handlebar of a type for sprint races, that is, with curved arms. The characteristic of this solution is that the piston 6 is connected to the levers 44 for actuating the brakes without using cables; a connecting rod 64 being provided for this purpose rearwardly of the piston and coaxial thereto. The rod 64 is pivoted to an appendix 46 of the lever 44 for operating the brake. The actuation of the lever 44, in the direction R in FIG. 3, causes the displacement F of the connecting rod 64 and of piston 6 driven by the same rod. As for the rest, the operation is analogous to the preceding cases.

Also in this example, the oil reservoir (which will likewise be integrated in the handlebar) and the connecting conduit with the calliper have not been shown; besides, the drawing relates to one of the two brakes only, but is applicable to both.

Practically, all the construction details may vary in any equivalent way as far as the shape, dimensions, elements disposition, nature of the used materials are concerned, without nevertheless departing from the scope of the adopted solution idea and, thereby, remaining within the limits of the protection granted to the present patent.

What is claimed is:

1. A brake controlling apparatus comprising:
   a single lug with a first distal end and a second distal end, said first distal end rotatably attached to a single steering stem of a bicycle;
   a handlebar with a right handle lever and a left handle lever, said handlebar being fixed to said second distal end;
   a brake designed to apply friction to a wheel of said bicycle;
   a hydraulic circuit having a first end and a distal second end, said first end connected to said brake; and
   a right side fluid-operating pump and a left side fluid-operating pump, both said pumps being encapsulated inside said single lug, each of said pumps having a one side and another side, said one side being connected to said right and left handle levers respectively, and said another side being connected to said second end of said hydraulic circuit, said levers actuating said pumps to push fluid into said hydraulic circuit thereby applying said brake.

2. A brake controlling apparatus according to claim 1, wherein said pump comprises a piston connected to a respective said lever through a connecting rod.

3. A brake controlling apparatus according to claim 2, wherein a reservoir is provided with a lid which allows said piston to be accessed from the outside.

4. A brake-controlling apparatus according to claim 1, wherein each said pump comprises said piston connected to a respective said lever through an appendix of said lever.

5. A brake controlling apparatus according to claim 1, wherein said pump comprises a piston connected to a respective said lever through a relevant cable held within a sheath.

6. A brake controlling apparatus according to claim 1, wherein each said pump comprises a piston connected to a respective said lever through a relevant cable held within a sheath, said cable being fixed to the body of said handlebar and said piston being pushed by said sheath.

7. A brake controlling apparatus according to claim 1, wherein said pump is connected with a reservoir held in said handlebar or in an integral portion associated with said handlebar.

8. A brake arrangement for a bicycle, the arrangement comprising:
   a bicycle frame including a steering sleeve;
   a brake mounted on said bicycle frame and applying friction to a wheel of the bicycle;
   an hydraulic circuit having one end connected to said brake;
   a steering stem rotatably mounted in said steering sleeve;
   a lug connected to said steering stem;
   a handlebar connected to said lug;
   a pump arranged inside said lug and connected to another end of said hydraulic circuit for forcing fluid through said hydraulic circuit, into said brake, and applying friction to the wheel;
   a brake lever device mounted on said handlebar and spaced from said lug, said brake lever device being operatively connected to said pump;
   a cable connecting said brake lever device to said pump, said cable transferring motion of said brake lever device to said pump to force the fluid through said hydraulic circuit.

9. The apparatus of claim 8, wherein said pump comprises a piston connected to said brake lever device through an appendix of said brake lever device.

10. The apparatus of claim 8, wherein said pump comprises a piston connected to said brake lever device through a relevant cable held within a sheath.

11. A brake arrangement for a bicycle, the arrangement comprising:
    a bicycle frame including a steering sleeve;
    a brake mounted on said bicycle frame and applying friction to a wheel of the bicycle;
    an hydraulic circuit having one end connected to said brake;
    a steering stem rotatably mounted in said steering sleeve;
    a lug connected to said steering stem;
    a handlebar connected to said lug;
    a pump arranged inside said lug and connected to another end of said hydraulic circuit for forcing fluid through said hydraulic circuit, into said brake, and applying friction to the wheel;
    a brake lever device mounted on said handlebar and spaced from said lug, said brake lever device being operatively connected to said pump, said pump comprising a piston connected to said brake lever device through a relevant cable held within a sheath, said cable being fixed to a body of said handlebar or to an integral portion associated with said handlebar, and said piston being pushed by said sheath.

12. An arrangement in accordance with claim 11, wherein:
    said pump includes a piston;
    said cable includes a sheath, said cable with said sheath being connected at one end to said brake lever device, another end of said sheath being connected to said piston, another end of said cable being fixed to said lug.

13. A brake arrangement for a bicycle, the arrangement comprising:
    a bicycle frame including a steering sleeve;

a brake mounted on said bicycle frame and applying friction to a wheel of the bicycle;

an hydraulic circuit having one end connected to said brake;

a steering stem rotatably mounted in said steering sleeve;

a lug connected to said steering stem, said lug having a first distal end and a second distal end, said first distal end being directly connected to said single steering stem of said bicycle;

a handlebar connected to said second distal end of said lug;

a pump arranged encapsulated inside said lug and connected to another end of said hydraulic circuit for forcing fluid through said hydraulic circuit, into said brake, and applying friction to the wheel.

* * * * *